United States Patent Office 3,812,120
Patented May 21, 1974

---

3,812,120
TRISUBSTITUTED-s-TRIAZINES
Logan C. Bostian, Convent Station, N.J., assignor to Allied Chemical Corporation, New York, N.Y.
No Drawing. Original application Oct. 24, 1969, Ser. No. 869,378, now Patent No. 3,704,112. Divided and this application July 18, 1972, Ser. No. 272,811
Int. Cl. C07d 55/20
U.S. Cl. 260—249.8                             1 Claim

ABSTRACT OF THE DISCLOSURE

Novel adducts of 2-alkylamino-4-amino-6-chloro-s-triazines with chloroacetaldehydes are prepared by reacting the amino substituted-s-triazine with di- or trichloroacetaldehyde in an inert solvent. Reaction temperatures of 40 to 100° C. for one-half to one hour are preferred. The reaction mixture may be cooled to separate the product; evaporation of the solvent at advanced temperatures should be avoided as this may form undesirable by-products. The products are highly selective herbicides.

---

This is a division of application Ser. No. 869,378, filed Oct. 24, 1969, now U.S. Pat. 3,704,112.

BACKGROUND OF THE INVENTION

This invention relates to novel addition products of 2-4-6-trisubstituted-s-triazines which contain one mol of chloroacetaldehyde per mol amino-s-triazine which are useful as herbicides. Over the past few years, a large number of chemical herbicides have been placed on the market; but despite the increasing number of herbicides, there remain problems for which none or few herbicides are appropriate. For example, non-selective herbicides are available which when used for postemergence will produce high kills of all vegetation; selective herbicides are available which will attack dicotyledonous or monocotyledonous plants but which also cause a high percent of crop injury. There are very few compounds available which are so selective that they will attack all forms of vegetation with the exception of one crop and accordingly there is a great need in the art for such a herbicide. This need may be shown by the fact that previously, in order to destroy all vegetation except one crop, it was necessary to employ at least two separate herbicides, a method which would make such a procedure economically and commercially impractical.

SUMMARY OF THE INVENTION

The novel addition products of the instant invention contain one mol of chloroacetaldehyde per mol of amino-s-triazine and are postulated to have the structure

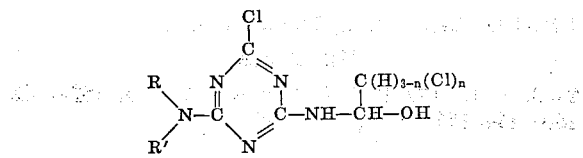

wherein R is alkyl containing up to five carbon atoms, R' is hydrogen or alkyl containing up to five carbon atoms, and $n$ is an integer from 2 to 3 inclusive. These products are highly selective herbicides.

DESCRIPTION OF THE INVENTION

The novel compounds of the present invention are normally prepared by reacting a 2-alkylamino-4-amino-6-chloro-s-triazine with a chloroacetaldehyde in an inert organic solvent at a temperature of about 30 to 110° C., preferably 40 to 100° C. A reaction time of one-half to one hour is normally sufficient. Recovery of the reaction product from the reaction solvent is normally carried out by cooling the reaction mixture to precipitate the product, which is then separated by filtration. Alternatively, the solvent may be removed from the product by evaporation under reduced pressure.

Approximately equimolar amounts of the two reactants are used. Reaction may be carried out with or without inert solvents such as benzene, toluene, chloroform, and carbon tetrachloride. The di- and trichloroacetaldehydes are available commercially.

The 2-alkylamino-4-amino-6-chloro-s-triazines of use in the preparation of the instant products may be synthesized by means taught in the art, for example, Pearlman and Banks, J. Am. Chem. Soc., 70 3726–3728 (1948).

The instant compounds have been found to be unexpectedly effective herbicides in that they are very harmful to plants normally considered undesirable, such as grass and broadleafed weeds, while being harmless toward such plants as corn. Adducts of 2-amino-4-chloro-6-isopropylamino-s-triazine with di- or trichloroacetaldehyde are the preferred compounds for this purpose. The compound 2-chloro-4-(1-hydroxy-2,2,2-trichloroethylamino)-6-isopropylamino-s-triazine is particularly useful because it will selectively destroy weeds in both corn and oat crops, making possible an initial crop of corn immediately followed by an oat crop.

Normally, the instant compounds will be used as the active ingredient in a herbicidal composition, although they might also be used without a carrier. Various diluents and carriers may be employed and the percent of active ingredient may be varied. Although compositions with less than about 0.25 percent by weight of active ingredient may be used, it is desirable to use compositions containing at least about 5.0 percent of active ingredient because otherwise the amount of carrier becomes excessively large. Activity increases with the concentration of active ingredient, which may be 10, 50, 95 percent or even higher.

The amount of composition which is applied for effective herbicidal action is dependent upon considerations such as the type of undesirable plant to be killed, the density of undesirable plants, and soil and climatic conditions. Usually, sufficient composition will be applied to provide about one to ten pounds of active ingredient per acre.

The instant herbicidal compositions may be in the form of a solution, with the solvent being selected from acetone, methanol and the like. These solutions can be applied to the plants in a direct manner such as by spraying, sprinkling, drenching, etc. Liquid suspensions can also be applied in this manner, with the dispersant selected from liquids such as water and the like.

Application can also be achieved by dusting a powder in which the active ingredient is dispersed. Suitable carriers include finely powdered material such as clay, fuller's earth and talc.

The instant compounds may constitute the sole active ingredient in the herbicidal compositions, but they might be effectively used in combination with other active ingredients, such as other herbicides and other plant treating agents.

The following examples are provided to more fully illustrate the instant invention. They are provided for illustrative purposes only and are not to be construed as limiting the scope of the invention, which is defined by the appended claims.

EXAMPLE I 2-chloro-4-(1-hydroxy-2,2,2-trichloroethylamino)- 6-isopropylamino-s-triazine

*Preparation.*—Chloral (0.2 mol) dissolved in toluene (100 ml.) was added to 2-amino-4-chloro-6-isopropylamino-s-triazine (0.2 mol) dissolved in toluene. The solution was heated to reflux temperature for 35 minutes, cooled to 12° C. and filtered. The toluene solvent was removed under vacuum and the resulting solid dried at 40° C. A 93 percent yield of solid was obtained which melted at 145 to 146° C. with decomposition.

*Characterization.*—The subject compound, 2-chloro-4-(1-hydroxy - 2,2,2 - trichloroethylamino) - 6 - isopropylamino-s-triazine, was characterized by elemental analysis, infrared spectra, and thin layer chromatography. Elemental analysis was as follows:

|  | Percent | |
| --- | --- | --- |
|  | Theory | Found |
| Carbon | 28.65 | 29.42 |
| Hydrogen | 3.31 | 3.31 |
| Nitrogen | 20.90 | 21.02 |
| Chlorine | 42.33 | 42.77 |

The infrared spectra showed peaks characteristic of the postulated structure. Details of herbicidal tests of the compound are furnished in Example II.

EXAMPLE II

Herbicidal activity

The following crop species and weed species were planted in metal flats (12 x 8.5 x 4 inches) in greenhouse potting soil containing one-third mixed clay and sand, one-third mushroom soil, and one-third peat moss. The pH of the soil was 6.8 to 7.2.

*Crop Species:*
  Corn, *Zea mays*
  Cotton, *Gossypium hirsutum*
  Sugar Beet, *Beta vulgaris*
  Soybean, *Glycine max*
  Oats, *Avena sativum*
*Weed Species:*
  Mustard
  Green Foxtail
  Crabgrass
  Buckwheat
  Morning Glory
  Barnyard Grass
  Yellow Nut Sedge Each flat received a volume of spray equal to 50 gallons per acre of an acetone solution of 2-chloro-4-(1-hydroxy - 2,2,2 - trichloroethylamino) - 6 - isopropylamino-s-triazine. The concentration of the solution was adjusted to provide application of 1.25, 2.5, 5, and 10 pounds of active ingredient per acre. Immediately after spraying, the test flats were placed in aluminum trays and were irrigated until the surface of the soil in the flat was uniformly moist (at field capacity). Additional subirrigation was provided as needed to maintain moisture. No surface irrigation was applied.

The flats were sprayed within one day after seeding in pre-emergence tests, and 8 to 10 days after seeding in th postemergence tests. Results were observed 14 days after spraying in the pre-emergence tests and in the postemergence tests.

The effect of the herbicide was evaluated in terms of the injury rating index scale, ranging from 0 to 10 as follows:

0 — No visible injury.
1, 2, 3 — Slight injury, plant usually recovered with little or no reduction in top growth.
4, 5, 6 — Moderate injury, plants usually recovered, but with reduced top growth.
7, 8, 9 — Severe injury, plants usually did not recover.
10 — All plants killed.

An injury rating of 3 is the maximum tolerated for crops and a rating of 7 is the minimum acceptable on weed plants. Table I shows results of the herbicidal tests on 2-chloro - 4 - (1 - hydroxy - 2,2,2 - trichloroethylamino)-6-isopropylamino-s-triazine prepared as in Example I.

It can be seen from Table I that the herbicidal tests showed 2-chloro - 4 - (1-hydroxy - 2,2,2 - trichloroethylamino)-6-isopropylamino-s-triazine to be a very active and selective herbicide. It was noted that with pre-emergence application, this compound appears to be translocated from roots to shoots as the plants emerge. The plants turn chlorotic and eventually die. Corn is resistant to both pre-emergence and postemergence applications. Moreover, in pre-emergence tests, there was little or no injury to oats. Thus, this compound is very useful because it will selectively destroy weeds in both corn and oats crops, making possible an initial crop of corn immediately followed by an oat crop.

TABLE I.—INJURY RATING
2-chloro-4-(1-hydroxy-2,2,2-trichloroethylamino)-6-isopropylamino-s-triazine

| Plant | Pre-emergence—14 days | | | | Postemergence—14 days | | | |
| --- | --- | --- | --- | --- | --- | --- | --- | --- |
|  | + | ++ | +++ | ++++ | + | ++ | +++ | ++++ |
| Corn | 0 | 1 | 2 | 0 | 0 | 0 | 0 | 0 |
| Cotton | 2 | 5 | 8 | 5 | 3 | 7 | 10 | 10 |
| Sugar Beet | 10 | 10 | 10 | 9 | 9 | 10 | 10 | 10 |
| Soybean | 1 | 3 | 6 | 6 | 3 | 8 | 10 | 10 |
| Oats | 0 | 1 | 3 | 5 | 4 | 7 | 10 | 9 |
| Mustard | 10 | 10 | 10 | 10 | 9 | 10 | 10 | 10 |
| Green Foxtail | 3 | 9 | 10 | 9 | 0 | 0 | 4 | 7 |
| Crabgrass | 10 | 10 | 10 | 10 | 0 | 0 | 0 | 8 |
| Buckwheat | 10 | 10 | 10 | 7 | 10 | 10 | 10 | 10 |
| Morning Glory | 10 | 10 | 10 | 7 | 7 | 9 | 10 | 10 |
| Barnyard Grass | 4 | 8 | 10 | 10 | 3 | 5 | 10 | 10 |
| Yellow Nut Sedge | 8 | 8 | 9 | 5 | 10 | 10 | 10 | 5 |

+ = 1.25 pounds of active ingredient per acre.
++ = 2.5 pounds of active ingredient per acre.
+++ = 5.0 pounds of active ingredient per acre.
++++ = 10.0 pounds of active ingredient per acre.

EXAMPLE III

2-Chloro-4-(1-hydroxy-2,2-dichloroethylamino)-6-isoproyplamino-s-triazine

Preparation.—Dichloroacetaldehyde (0.1 mol) and 2-amino-4-chloro - 6 - isopropylamino-s-triazine (0.1 mol) were added to 25 ml. toluene and the slurry was heated at 100° C. to dissolve the reactants. This solution was held at 100° C. for one hour, then cooled to 25° C. A white solid precipitated during a two-hour period at 25° C. The slurry was filtered, and the white product rinsed with 10 ml. toluene. The wet cake was dried at 30° C. in a vacuum oven, yielding 0.07 mol of 2-chloro-4-(1-hydroxy - 2,2 - dichloroethylamino)-6-isopropylamino-s-triazine which melted at 100 to 104° C. with decomposition.

Characterization.—The product was characterized by infrared spectra and thin layer chromatography. Postemergence tests at six pounds per acre killed ragweed, bracted plantain and smartweed, but there was no visible injury of corn.

EXAMPLE IV

The procedure of Examples I and III were repeated using an equivalent amount of the appropriate 2-alkylamino-4-amino-6-chloro-s-triazine in place of the isopropylamino-s-triazine substituent to afford the following selective herbicides:

2-Chloro-4-(1-hydroxy-2,2,2-trichloroethylamino)-6-methylamino-s-triazine

2-Chloro-4-(1-hydroxy-2,2,2-trichloroethylamino)-
6-n-butylamino-s-triazine
2-Chloro-4-(1-hydroxy-2,2,2-trichloroethylamino)-
isoamylamino-s-triazine
2-Chloro-4-(1-hydroxy-2,2,2-trichloroethylamino)-
6-dimethylamino-s-triazine
2-Chloro-4-(1-hydroxy-2,2,2-trichloroethylamino)-
6-diethylamino-s-triazine
2-Chloro-4-(1-hydroxy-2,2,2-trichloroethylamino)-
6-methylisopropylamino-s-triazine
2-Chloro-4-(1-hydroxy-2,2,2-trichloroethylamino)-
6-methylethylamino-s-triazine
2-Chloro-4-(1-hydroxy-2,2,2-trichloroethylamino)-
6-ethyl-n-butylamino-s-triazine
2-Chloro-4-(1-hydroxy-2,2,2-trichloroethylamino)-
6-ethylisoamylamino-s-triazine
2-Chloro-4-(1-hydroxy-2,2-dichloroethylamino)-
6-methylamino-s-triazine
2-Chloro-4-(1-hydroxy-2,2-dichloroethylamino)-
6-n-butylamino-s-triazine
2-Chloro-4-(1-hydroxy-2,2-dichloroethylamino)-
6-isoamylamino-s-triazine
2-Chloro-4-(1-hydroxy-2,2-dichloroethylamino)-
6-dimethylamino-s-triazine
2-Chloro-4-(1-hydroxy-2,2-dichloroethylamino)-
6-diethylamino-s-triazine
2-Chloro-4-(1-hydroxy-2,2-dichloroethylamino)-
6-methylisopropylamino-s-triazine
2-Chloro-4-(1-hydroxy-2,2-dichloroethylamino)-
6-methylethylamino-s-triazine
2-Chloro-4-(1-hydroxy-2,2-dichloroethylamino)-
6-ethyl-n-butylamino-s-triazine
2-Chloro-4-(1-hydroxy-2,2-dichloroethylamino)-
6-ethylisoamylamino-s-triazine

What is claimed is:
1. The compound 2-chloro-4-(1-hydroxy-2,2-dichloroethylamino)-6-isopropylamino-s-triazine.

References Cited
FOREIGN PATENTS
115    1/1968    Japan _____ 260—249.8

JOHN M. FORD, Primary Examiner

U.S. Cl. X.R.
71—93